(12) United States Patent
Lee et al.

(10) Patent No.: US 6,500,344 B1
(45) Date of Patent: Dec. 31, 2002

(54) METHOD AND APPARATUS FOR FILTERING PARTICLES OUT OF A LIQUID

(76) Inventors: Hyosong Lee, Malmvagen 20, SE-147 00 Tumba (SE); Lars Ehnstrom, Kristinebergs Strand 33, SE-112 52 Stockholm (SE)

(*) Notice: Subject to any disclaimer, the term of this patent is extended or adjusted under 35 U.S.C. 154(b) by 0 days.

(21) Appl. No.: 09/720,874
(22) PCT Filed: May 3, 2000
(86) PCT No.: PCT/SE00/00852
§ 371 (c)(1),
(2), (4) Date: Jan. 2, 2001
(87) PCT Pub. No.: WO00/66246
PCT Pub. Date: Nov. 9, 2000

(30) Foreign Application Priority Data

May 3, 1999 (SE) .............................. 9901577

(51) Int. Cl.[7] ................... B01D 37/00; B01D 33/073; B01D 33/46; B01D 33/50
(52) U.S. Cl. ................ 210/744; 210/784; 210/791; 210/805; 210/97; 210/107; 210/121; 210/123; 210/197; 210/262; 210/396; 210/402; 210/408; 210/411; 210/532.1

(58) Field of Search ................. 210/744, 784, 210/791, 797, 805, 97, 103, 104, 107, 121, 122, 123, 194, 197, 259, 262, 391, 396, 402, 408, 409, 411, 532.1

(56) References Cited

U.S. PATENT DOCUMENTS 5,762,790 A  6/1998  Zoeller ................ 210/238

FOREIGN PATENT DOCUMENTS

EP    0 848 977    6/1998

*Primary Examiner*—Robert J. Popovics
(74) *Attorney, Agent, or Firm*—Young & Thompson

(57) ABSTRACT

Method and arrangement for filtering particles out of a liquid, in which the liquid containing particles is supplied to a sedimentation tank (12), and the liquid is made, by means of hydrostatic liquid pressure prevailing in the tank, to flow through a filter member (18) on the shell surface of a drum (14) mounted in the tank (12). When the liquid in the tank has risen to a predetermined level above the drum (14) as a result of clogging of the filter member (18), cleaning of the filter member (18) in situ in the tank is initiated.

20 Claims, 5 Drawing Sheets

METHOD AND APPARATUS FOR FILTERING PARTICLES OUT OF A LIQUID

The present invention relates to filtering particles out of liquids and relates in particular to a method and an arrangement for filtering particles out of a liquid by means of hydrostatic pressure acting on a filter member which is submerged in the liquid in a tank.

For filtering solid particles out of liquids, a large number of different filtering principles are known within the processing industry, which are adapted to the types of particles to be filtered and the desired degree of filtering of the filtrate. As the cost of many filter aids is relatively high, various filter constructions and arrangements have been developed, in which the filter member in the form of, for example, a drum filter, a sand filter, a coating filter etc., is self-cleaning in some way, for example by back-flushing or by means of scrapers, brushes or the like, which clean the filter surface of filter cakes accumulated thereon. A disadvantage of such self-cleaning filters, however, is that they create waste which has to undergo further treatment In sand filters, for example, the waste flow, that is to say the flushing water, accounts for roughly 5–10% of the total flow. Cleaning of the filter surface by means of mechanical aids, such as scrapers and brushes, usually takes place in contact with air, which contributes to clogging of the filter surfaces.

EP-0 848 977 A2 describes a method and arrangement for filtering particles out of a liquid, in which the liquid containing particles is supplied to a cleaning tank, the liquid being made, by means of hydrostatic liquid pressure prevailing in the tank, to flow through a particle-collecting filter member on the shell surface of a drum rotating continuously in the tank after which cleaned liquid inside the drum is drained off via an outlet The drum operates with roughly ⅔ of its height submerged in the liquid, and the filter on the inside of its shell surface is cleaned continuously by means of back-flushing by compressed air from inside the drum during its rotation, filter cleaning taking place in air above the level of the liquid.

One object of the present invention is to eliminate said disadvantages of known filtering systems and propose a method and an arrangement for filtering particles out of liquids, in which the self-cleaning filter system does not consume filter aids or produce other waste from the liquid mixture than the sludge which is collected by the filter member, and in which the cleaning system operates below the liquid surface so as to avoid clogging of the filter member and to increase the filtering capacity of the cleaning arrangement.

To achieve this object, the method and the arrangement for filtering according to the present invention are characterized by the features indicated in the patent claims below.

In the appended drawings.

Figure 1:
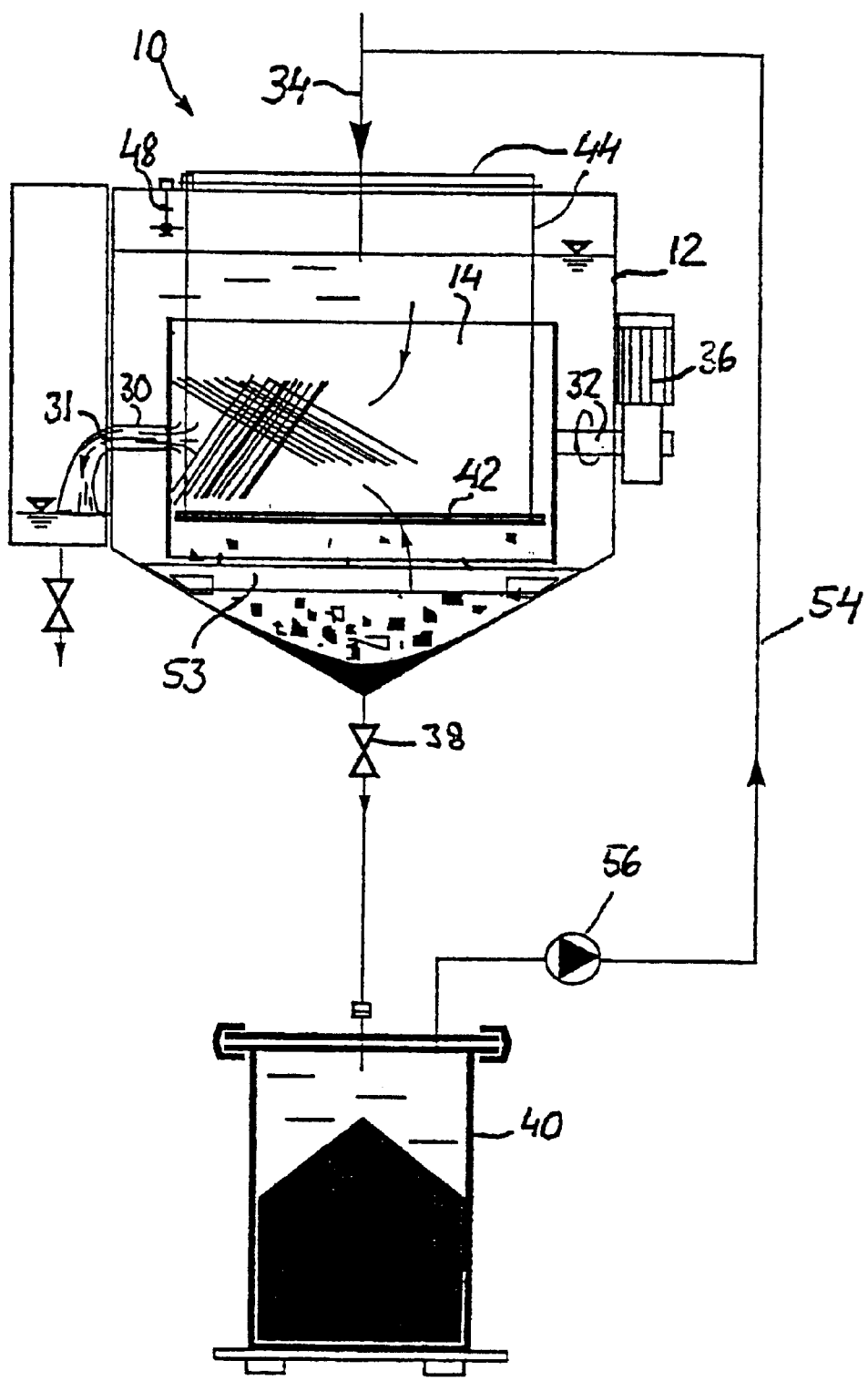
FIG. 1 is a side view of a first embodiment of a filtering arrangement according to the invention, which operates by means of hydrostatic pressure, with a sludge container connected to it.
Figure 3:
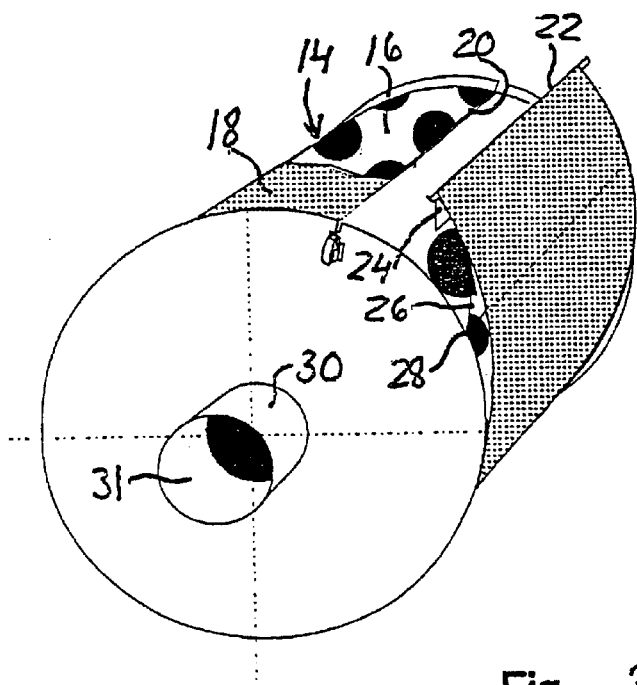
FIG. 3 is a perspective view of a filtering drum which forms part of the filtering arrangement in FIGS. 1 and 2, shown during mounting of a filter member on its shell surface.

FIG. 1 shows a first embodiment of a filtering arrangement which operates by means of hydrostatic pressure according to the present invention. The filtering arrangement, designated generally by 10, comprises a sedimentation tank 12, in which a filtering drum 14 is mounted, which can be rotated about a horizontal axis and has a perforated shell surface 16, over which a filter member 18 (FIG. 3), preferably in the form of a filter gauze, is clamped. FIG. 3 shows a filter gauze 18 during mounting on the perforated shell surface 16, one end edge 20 of the filter gauze 18 being fixed in a longitudinal edge or slot on the shell surface, while the other end edge 22 is fixed to a corresponding edge 24 of a shell segment 26 of the drum 14, which is pivotable about a hinge 28. In addition to forming a filter gauze holder, the shell segment 26 also forms an opening by means of which the interior of the drum 14 can be made accessible.

The drum 14 is mounted in the tank 12 via shaft pivots 30, 32, at least one shaft pivot 30 of which can be hollow so as to form an outlet 31 for the filtrate inside the drum 14. An electric motor 36 is arranged so as to rotate the drum 14 for cleaning of the filter gauze 18, as will be described in greater detail below.

Also connected to the tank 12 is an inlet 34 for the liquid to be filtered, for example an oil containing grinding particles. In the bottom of the tank 12, there is an openable and closable sludge outlet 38 which can be connected to a sludge container 40 below.

For the purpose of cleaning the filter gauze 18, when it has become clogged by particle sludge on the outside, a scraping or brushing element 42 is mounted close to the outside of the drum 14 by means of arms 44.

The embodiment of the filtering arrangement according to the invention shown in FIGS. 1–3 operates in the following manner.

When the filtering process is started the empty tank 12 is gradually filled, via the inlet 34, with the liquid containing particles. The liquid phase can flow through the filter gauze 18 and into the drum 14, while larger particles settle directly on the bottom of the tank 12 and smaller particles adhere to the filter gauze 18.

Figure 4:
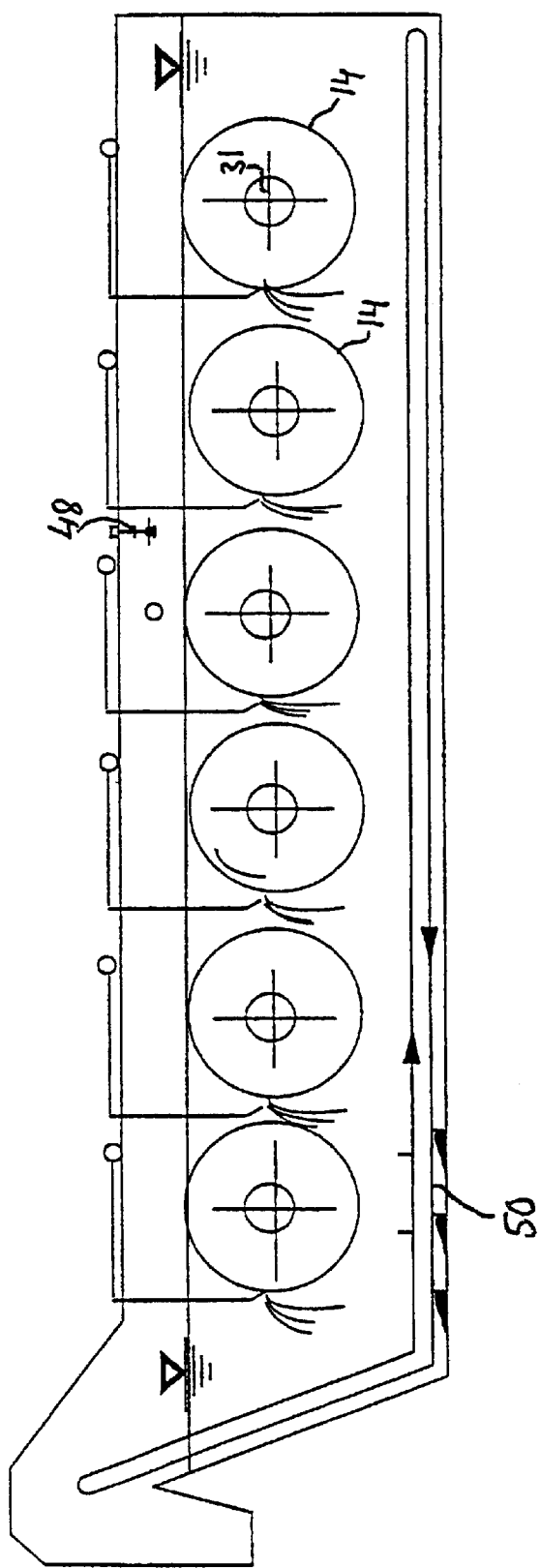
FIG. 4 shows a filtering arrangement which comprises a plurality of filtering drums in a common tank.

When the level of the liquid rises above the level of the filtrate outlet 31, the filtered liquid starts to leave the interior of the drum 14 owing to the hydrostatic pressure acting on the filter gauze 18 as a result of the liquid column above the outlet 31. As the filter surface becomes blocked from below by particles adhering to it and to particle sludge which has already accumulated, the level of the liquid in the tank 12 rises, and new, higher filter surface of the filter gauze 18 is used for filtering the particles. When the free liquid surface 46 has, on account of the particle accumulation on the filter surface, risen to a predetermined level above the drum 14, which is sensed by a level monitor 48 in the tank, a filter cleaning process is initiated, the electric motor 36 being actuated in order to set the filter drum 14 in rotation for a few revolutions, during which the scraping or brushing element 42 is made to scrape off the filter cake which has built upon the outside of the filter gauze 18 and which then settles on the bottom of the tank 12 and is conveyed, via the sludge outlet 38, to the sludge container 40 below. Alternatively, the sludge can be conveyed away from the bottom of the tank by means of a pump (not shown) or a scraping mechanism 50 as shown in the embodiment in FIG. 4, in which a plurality of filter drums 14 are mounted in one and the same tank for the purpose of increased filtering capacity.

The drum 14 is preferably stationary during the filtering process described above and is rotated only for cleaning of the filter 18.

For certain types of sludge, scraping or brushing elements 42 are not required for filter cleaning, but simply a more rapid rotation may be sufficient to free the sludge cake on account of the centrifugal force and the liquid shear which occurs at the shell surface of the filter drum 14 during rotation. If appropriate, blade-shaped drivers 52 can be arranged on the inside and/or the outside of the drum 14, which can bring about back-flushing of the filter gauze 18 from the inside out, or liquid brakes 53 can be arranged outside the drum 14, which, when the drum is rotated, create turbulence in the liquid in order to free the sludge cake.

During the filtering process, the sludge in the sludge container 40 can be concentrated by a pilot flow 54 from the tank 12 and the container 40 being recirculated to the tank 12 by means of a pump 56 as indicated in FIG. 1, the sludge settling in the container 40 during the time the particle flow is in it.

EXAMPLES

The filter arrangement described above has been tested for separating grinding oil for stainless steel. The oil had a viscosity of 30 cSt and the contaminated oil contained solid particles of a size of roughly 10-5000 $\mu$m. The filter had a diameter of 955 mm, a length of 1200 mm, and a filter surface area of 3.4 m$^2$, and consisted of a nylon gauze with a mesh width of 500 $\mu$m, the free filter area amounting to 0.42 m$^2$.

The cleaning arrangement comprised a 30 mm wide brush 42 arranged axially along the entire length of the filter. The brush 42 was anchored in the sedimentation tank 12 and rested against the filter surface. The filter was charged with a flow of roughly 1000 liter/min. The test results showed that the filtrate was almost free of particles larger than 100 $\mu$m. For roughly 30 minutes, the level of the liquid remained constant directly above the filter, after which it rose rapidly. This means that the coating process on the filter surface with particles larger than 500 $\mu$m took about a minute, after which the main filtering took place through the filter cake itself. The filter cake was completely clogged after roughly a further 30 minutes operation. When the level of the liquid had reached the level monitor 48, the cleaning system was actuated, that is to say the electric motor 36 started and the drum filter was made to rotate 2–3 revolutions against the stationary brush 42. The level of the liquid then fell rapidly to the original position directly above the filtrate outlet, after which the filtering cycle could be started again. In the same application as above, it was also possible to remove the filter cake and clean the filter member 18 simply by rotating the drum 14 for a slightly longer time (6–8 revolutions). In this case also, the level of the liquid fell rapidly to the filtrate outlet level, and the time between subsequent cleanings remained relatively constant, which shows that the cleaning was effective.

Figure 6:
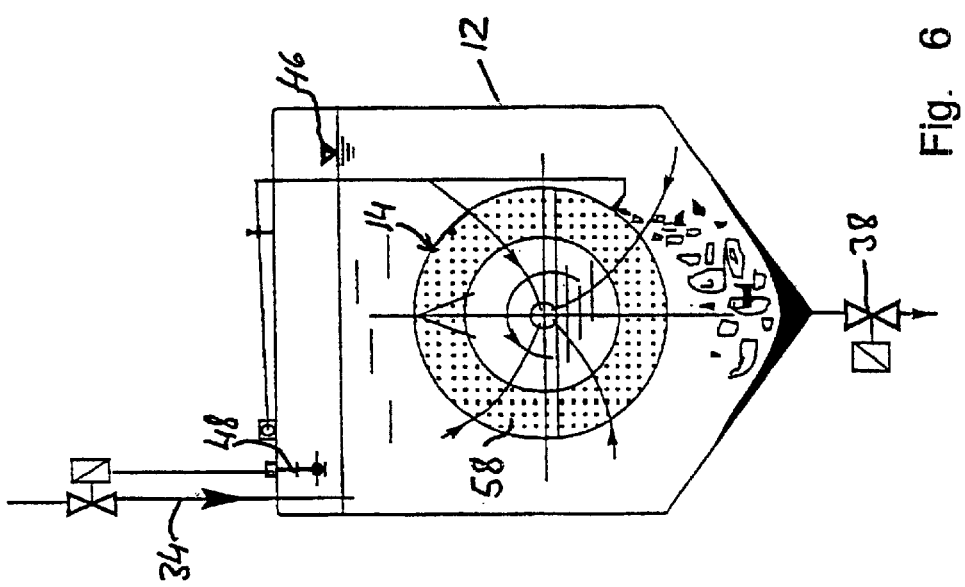
FIG. 6 is an end view of the arrangement in FIG. 5.
Figure 5:
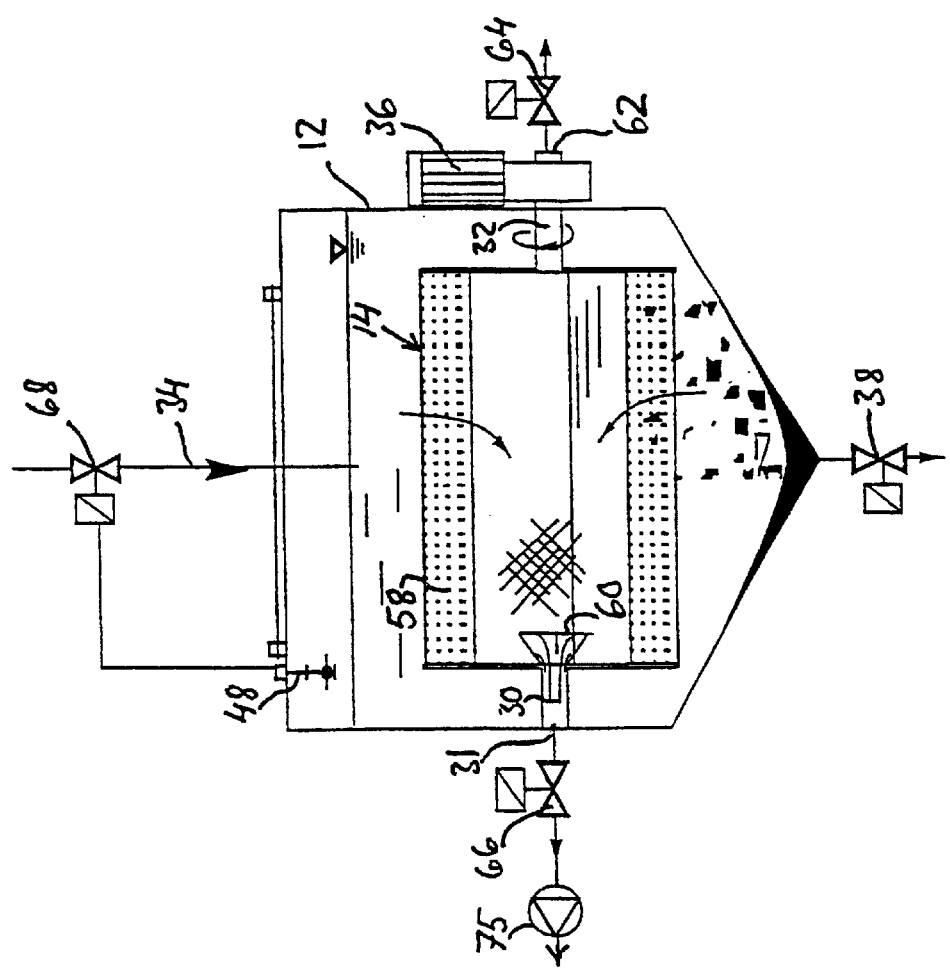
FIG. 5 shows a side view of an alternative embodiment of the filtering arrangement according to the present invention.

FIGS. 5 and 6 show an alternative embodiment of the filtering arrangement according to the present invention. In contrast to the embodiment in FIGS. 1–3, the filter member in the arrangement in FIGS. 5 and 6 consists of a bed 58 of free filter particles with a density greater than that of the liquid, for example sand, which bed 58 is located on the inside of the filtering drum 14 and is formed by the drum 14 rotating at a speed which produces slightly more than 1 g during the filtering process. Mounted on the inside of the shell surface of the drum 14 in this connection is a strainer plate with perforations, the hole diameter of which is smaller than the diameter of the smallest free filter particles forming the filter bed 58. When stationary, the drum 14 can be filled with, for example, sand up to a level directly below the filtrate outlet 31 which is likewise provided with a strainer plate 31 which prevents the filter particles (the sand) from passing out through the filtrate outlet 31. In this embodiment, that shaft pivot 32 of the drum 14 opposite the filtrate outlet 31 forms a sludge outlet 62.

Before starting the filtering process in this embodiment, sludge outlet valves 38 and 64 and the filtrate valve 66 are kept closed, and a filtrate pump 75 remains off, while the inlet valve 68 is opened and the tank 12 is filled with suspension, after which the valve 68 is closed. The drum 14 is started, and the rotation is adapted so that the filter particles, for example sand grains, are distributed uniformly on the inside of the strainer plate on the shell surface and form a homogeneous filter bed 58 of uniform thickness. After this, the filtrate pump 75 is started, and the inlet valve 68 is opened again, and the filtering process can be started. The sludge valve 64 is suitably opened for a short time so as to drain unfiltered liquid, after which the sludge valve 64 is closed, the filtrate valve 66 is opened, and the filtrate pump 75 is started. The inlet valve 68 then regulates the flow to the drum filter in such a manner that the level of the liquid 46 is kept essentially constant. When the filter bed 58 begins to become clogged, the counter-pressure in the filter bed increases, and the level of the liquid in the tank 12 rises to the level monitor 48 which then closes the inlet valve 68 and the filtrate valve 66 and stops the filtrate pump 75 and the electric motor 36 and thus the rotation of the drum 14. The contaminated filter bed 58 is destroyed, and the filter particles (the sand) which are heavier than the liquid settle in the drum 14. When the drum 14 is braked, turbulence is created, which efficiently washes and removes the sludge from the filter particles. The sludge phase in the drum above the sedimented filter particles are then drained by virtue of the sludge valve 64 being opened, after which the lower sludge outlet valve 38 is opened for a short time so as to drain the sedimented sludge. The filtering cycle is then repeated.

The particle bed 58 can consist of uniform particles of the same density or particles of different density, so that different layers of varying particle thickness and properties are formed. Filtering by means of a filter bed 58 of the type described in the embodiment according to FIGS. 5 and 6 makes a type of deep-filtering possible, which is desirable in many applications.

Figure 2:
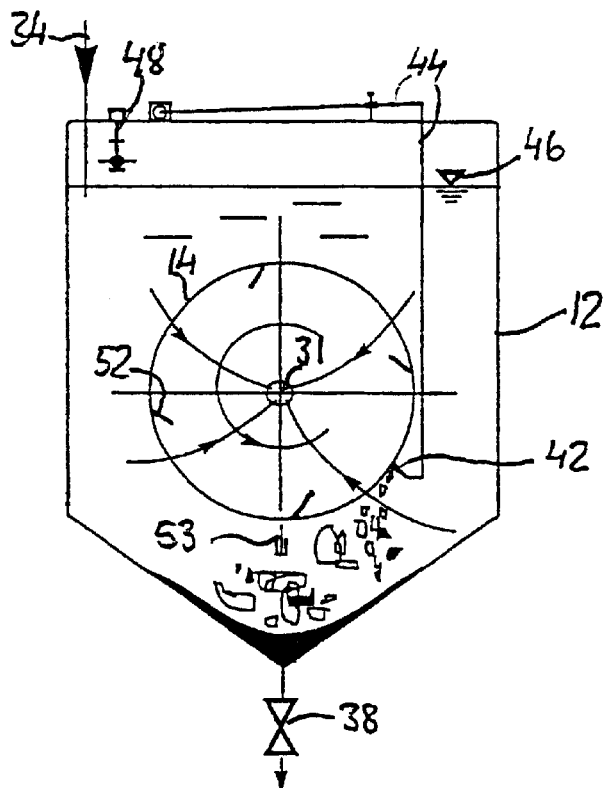
FIG. 2 is an end view of the filtering arrangement in FIG. 1.
Figure 8:
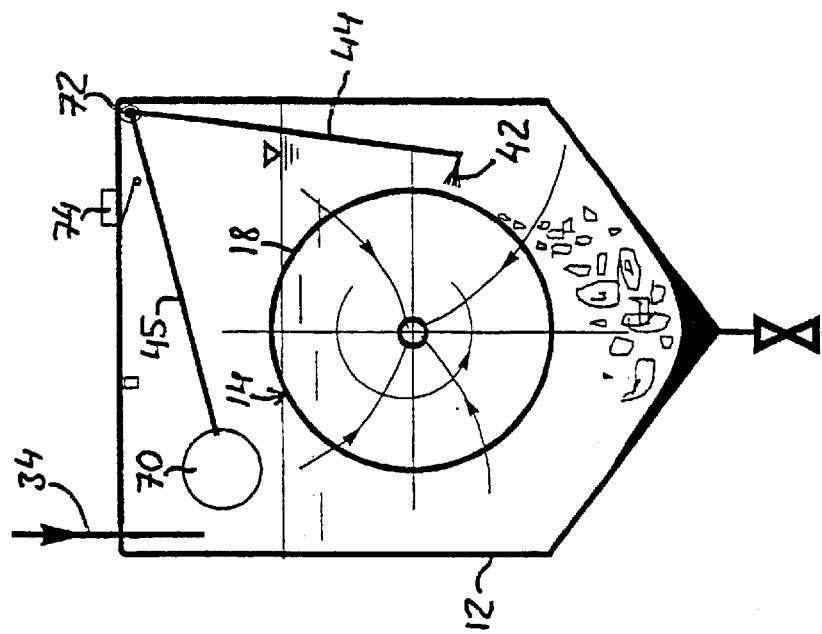
FIG. 8 is an end view of the arrangement in FIG. 7.
Figure 7:
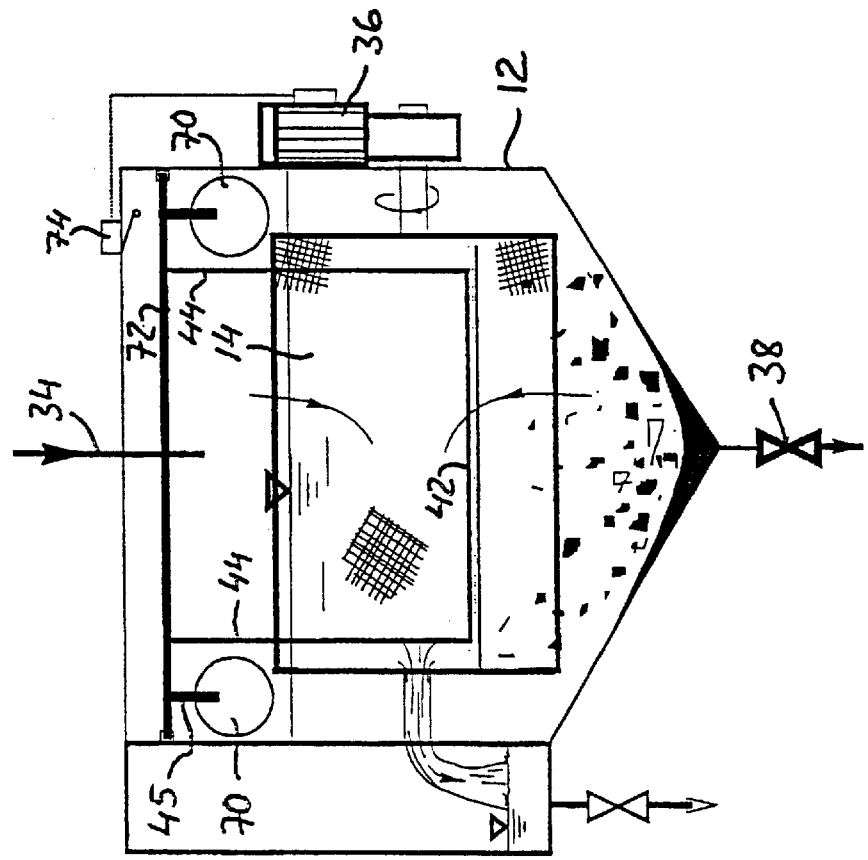
FIG. 7 is a view similar to FIG. 5 but shows a modified version of the first embodiment of the arrangement according to the invention according to FIGS. 1–3.

FIGS. 7 and 8 show a modification of the embodiment according to FIGS. 1–3, which makes possible partial retention of a layer of particle sludge accumulated on the filter surface when the drum filter 18 is cleaned. This is because it has been found that the sludge coating itself on the outside of the filter to a certain extent forms a filter which is capable of filtering out even very fine particles which would otherwise pass through the filter 18. In order to ensure that a given suitable layer thickness of particle sludge remains on the outside of the filter 18 during cleaning by means of the scraping or brushing element 42, the arm system for it is designed as a two-armed lever mechanism 44, 45, a float 70 on the end of each lever 45 being arranged so as, when the level of the liquid rises, to pivot the scraping or brushing element 42 about an articulation spindle 72 towards the filter 18, at the same time as a microswitch 74 actuates the electric motor 36 to rotate the drum 14. In this way, the brushing element 42 can be made to remove most of the sludge coating accumulated on the filter surface, and the free liquid surface in the tank 12 then falls again, as do the floats 70, which in turn results in the brushing element 42 being pivoted away from the drum filter 18 at the same time as the microswitch 74 cuts out the electric motor 36 so that the drum 14 stops. The sludge coating remaining on the drum filter 18 is then used as a complement to the filter 18 for filtering out fine particles which would otherwise pass through the filter 18, which improves the filtering properties and the capacity of the arrangement.

What is claimed is:

1. Method of filtering particles out of a liquid, in which the liquid containing particles is supplied to a sedimentation tank (12), the liquid being made, by means of hydrostatic liquid pressure prevailing in the tank (12), to flow through a particle-collecting filter member (18; 58) on the shell surface of a drum (14) mounted rotatably in the tank, after which cleaned liquid inside the drum (14) is drained off via an outlet (31), characterized in that, when the liquid in the tank has risen to a predetermined level (48) above the drum (14) as a result of clogging of the filter member (18; 58), cleaning of the filter member (18; 58) in situ in the tank is initiated.

2. Method according to claim 1, characterized in that a scraping member (42) is made to strip the outside of the filter member (18) during rotation of the drum (14).

3. Method according to claim 2, characterized in that, when the filter surface is cleaned, the scraping member (42) is made to bear against it in such a manner that a certain particle coating remains on the filter surface when cleaning is finished.

4. Method according to claim 1, characterized in that the cleaning of the filter member (18) is effected by back-flushing of the latter with liquid from inside the drum (14) when the latter is rotated.

5. Method according to claim 1, characterized in that the drum (14) is kept stationary during the filtering procedure.

6. Method according to claim 1, characterized in that the liquid in the tank (12) is made to flow through a filter member (58) on the inside of the shell surface of the drum in the form of a bed (58) of filter particles formed by rotation of the drum.

7. Method according to claim 6, in which the filter particles consist of sand, characterized in that the drum (14) is rotated at a speed which generates a centrifugal force greater than 1 g at the periphery of the drum when the liquid is filtered.

8. Method according to claim 6 or 7, characterized in that the filter member formed by the particle bed (58) is cleaned by the rotation of the drum (14) being reduced to such an extent that the particle bed (58) is destroyed and agitated, which frees accumulated sludge which is drained out of the drum (14) via a sludge outlet (62).

9. Arrangement for filtering particles out of a liquid, comprising a tank (12) with an inlet (34; 68) for the liquid to be filtered, a drum (14) mounted rotatably about a horizontal axis in the tank (12), a filter member (18; 58) on the shell surface of the drum (14), through which member the liquid can flow from the outside into the drum to separate particles from the liquid, a filtrate outlet (31) in the drum for cleaned liquid, a lower outlet (38) in the tank for filter-separated and sedimented particle sludge, and a member (42; 52; 36) for cleaning the filter member, characterized by a level monitor (48) arranged so as to initiate cleaning of the filter member (18; 58) when a predetermined liquid level above the drum (14) in the tank (12) is reached.

10. Arrangement according to claim 9, characterized in that the filter member is in the form of a filter gauze (18) which is clamped over the outside of a perforated shell plate (16) of the drum (14).

11. Arrangement according to claim 10, characterized in that the drum (14) has a pivotable shell segment (26) for clamping on and releasing the filter gauze (18).

12. Arrangement according to claim 9, characterized in that the cleaning member comprises a stripper member (42) arranged so as to bear against the outside of the filter member (18) when the drum (14) is rotated so as to scrape off accumulated sludge on the filter surface.

13. Arrangement according to claim 12, characterized in that the stripper member (42) is arranged so as to bear against the outside of the filter member (18) by means of a float-operated lever system (44, 45).

14. Arrangement according to claim 9, characterized in that the cleaning member comprises liquid drivers (52) arranged on the inside of the shell plate (16) of the drum for back-flushing the filter gauze (18) when the drum (14) is rotated.

15. Arrangement according to claim 9, characterized in that the filter member is formed by a bed (58) of filter particles which is produced against the inside of the shell plate (16) of the drum (14) when the drum is rotated, which particles have a greater density than the liquid to be filtered, and in that the cleaning member consists of means which reduce the rotation of the drum (14) to such an extent that the particle bed (58) is destroyed and agitated, which frees accumulated sludge which is drained out of the drum (14) via a sludge outlet (62).

16. Arrangement according to claim 15, characterized in that the particle bed (58) consists of sand.

17. Arrangement according to claim 15, characterized in that the drum (14) is mounted on a rotor shaft with a hollow shaft pivot (30, 32) at each end wall of the drum, one hollow shaft pivot (30) forming the outlet (31) for the filtrate, while the other hollow shaft pivot (32) forms the outlet (62) for sludge accumulated in the bed, which outlet (62) is closable.

18. Arrangement according to claim 17, characterized in that the drum (14) is filled with filter particles up to a level directly below the outlets (31, 62) in the drum when the latter is stationary.

19. Arrangement according to claim 9, characterized in that a plurality of drums (14) provided with filter members are mounted rotatably in the same tank.

20. Arrangement according to claim 19, characterized in that a scraping conveyor (50) is arranged on the bottom of the tank to convey separated particle sludge to a sludge outlet.

* * * * *